United States Patent
Cha et al.

(10) Patent No.: US 7,760,468 B2
(45) Date of Patent: Jul. 20, 2010

(54) AIR-BEARING DESIGN WITH PARTICLE REJECTION FEATURES

(75) Inventors: Ellis T. Cha, San Ramon, CA (US); Guoqiang Zheng, Dongguan (CN); Sindy Yeung, Fremont, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 300 days.

(21) Appl. No.: 11/110,153

(22) Filed: Apr. 19, 2005

(65) Prior Publication Data

US 2005/0237668 A1 Oct. 27, 2005

Related U.S. Application Data

(60) Provisional application No. 60/564,620, filed on Apr. 21, 2004.

(51) Int. Cl.
*G11B 5/60* (2006.01)
(52) U.S. Cl. .................. 360/235.6; 360/235.8; 360/236
(58) Field of Classification Search .............. 360/235.6, 360/235.8, 236.4, 236.6, 237, 236
See application file for complete search history.

(56) References Cited

U.S. PATENT DOCUMENTS

| | | | | |
|---|---|---|---|---|
| 4,646,180 | A * | 2/1987 | Ohtsubo | 360/236.6 |
| 5,097,370 | A * | 3/1992 | Hsia | 360/236.1 |
| 5,940,249 | A * | 8/1999 | Hendriks | 360/235.6 |
| 6,809,904 | B2 * | 10/2004 | Boutaghou et al. | 360/235.8 |
| 6,927,942 | B2 * | 8/2005 | Tani et al. | 360/235.6 |
| 7,190,550 | B2 * | 3/2007 | Mundt et al. | 360/110 |
| 2002/0109941 | A1 * | 8/2002 | Chapin et al. | 360/235.7 |
| 2002/0145828 | A1 * | 10/2002 | Mundt et al. | 360/235.6 |
| 2003/0058578 | A1 * | 3/2003 | Boutaghou et al. | 360/235.8 |
| 2004/0090709 | A1 * | 5/2004 | Mundt et al. | 360/236.3 |

* cited by examiner

*Primary Examiner*—Jefferson Evans
(74) *Attorney, Agent, or Firm*—Saile Ackerman LLC; Stephen B. Ackerman; Rosemary L. S. Pike

(57) ABSTRACT

An apparatus allowing for a slider for use in a disk drive is disclosed. An embodiment of the present invention may include a leading side, a trailing side, at least two main rails, a slider surface with an air bearing surface, and at least one trench substantially parallel to the width of the slider. The trench in the air bearing surface results in a lower compression length of the slider and allows for particles to be channeled off of the disk surface.

16 Claims, 4 Drawing Sheets

AIR-BEARING DESIGN WITH PARTICLE REJECTION FEATURES

RELATED APPLICATIONS

The present application claims priority to U.S. Provisional Application No. 60/564,620 filed on Apr. 21, 2004.

FIELD OF THE INVENTION

The present invention relates to the field air bearing sliders such as those used in hard disk drives. Specifically, the present invention relates to an air-bearing design for a slider that facilitates deflecting particles from interacting with slider circuitry.

BACKGROUND OF THE INVENTION

Magnetic hard disk drives store user data onto one or more rotating disks. The data is recorded and retrieved by magnetic head elements. Each magnetic head element is embedded onto a small slider (typically 1.25 mm by 1 mm by 0.3 mm) which is "flown" on top of the disks with spacing less than 10 nm. This spacing, or "flying height", is critical to recording density because in the current design the flying height of the magnetic head is inversely proportional to the recording density. The flying height is maintained by a self-acting air-bearing which is formed between the rotating disk and the air-bearing surface (ABS) etched onto the adjacent slider surface. The performance and reliability of the hard disk drives critically depends on maintaining the stability of the flying height. Small-sized debris and other contaminants (in the tenth of a micron range) in the disk drive can pass under the ABS altering the flying height and causing bit-error rates. Debris may appear from external sources or can be generated due to the movement of the disk-drive parts. It may cause the slider to crash into the disk thereby causing data loss. Moreover, if such debris is metallic it may cause shorts in the electrical operation of the disk drive. Therefore, the disk drive industry is in need of an air bearing surface design that includes particle deflection features that can aid in deflecting particles from the critical magnetic head elements.

DETAILED DESCRIPTION

Figure 1A:
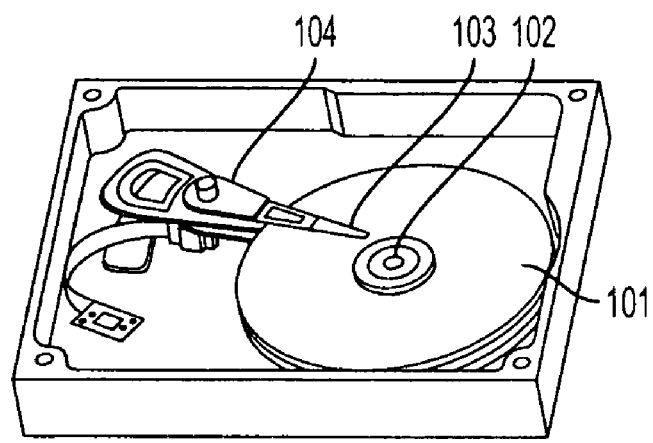
FIGS. 1a-b illustrates a hard disk drive as known in the art.
Figure 1B:
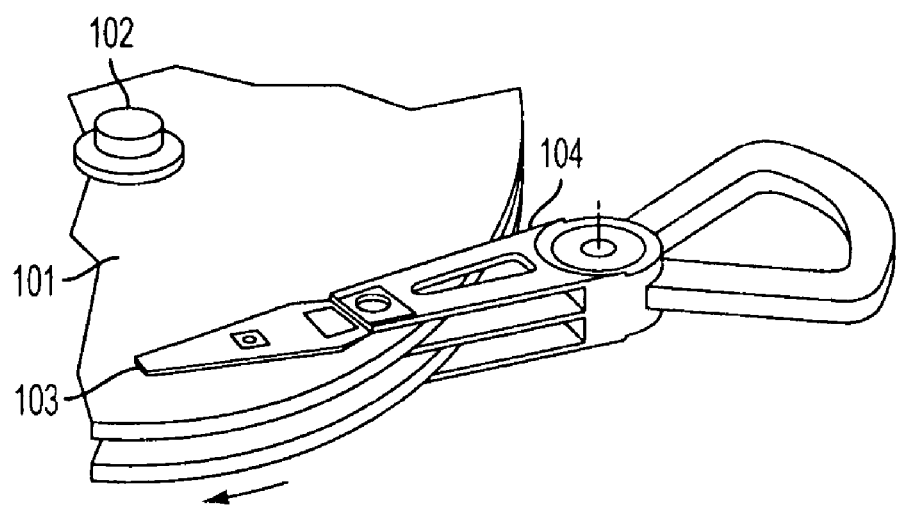

FIG. 1 shows a typical disk drive. A spindle motor 102 spins a disk 101 while a drive arm (head gimbal assembly) 104 driven by voice coil motors (VCM) controls the head 103 flying above the disk. Typically, voice coil motors have been used for controlling the drive arm motion across the magnetic hard disk, which is centered around the spindle motor. In the present art, microactuators are now being used to "fine-tune" the head placement because of the inherent tolerance (dynamic play) that exists in positioning a head by a VCM alone. This enables a smaller recordable track width, which in turn increases the density or the "tracks per inch" (TPI) value of the hard disk drive. FIG. 1b is a more detailed view of the aforementioned elements of FIG. 1a.

Figure 2:
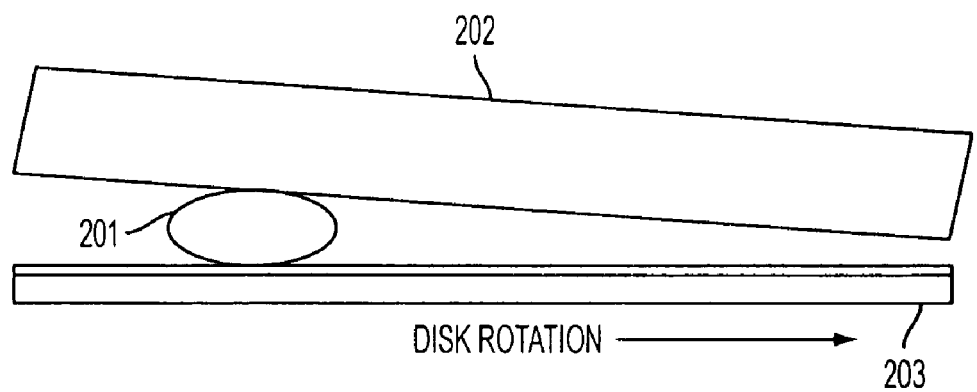
FIG. 2 illustrates how particles may be embedded between the magnetic head and the disk in a conventional disk drive.

As discussed above, one of the most detrimental occurrences to the integrity of the data is an embedded "hard" particle on the disk because it can potentially scratch the disk in the process of becoming embedded thereby causing data bit loss. Furthermore, it can gradually damage the magnetic head element as the head flies over the particle. FIG. 2 illustrates one manner in which particles may be embedded onto the disk. As seen in FIG. 2, a particle 201 can become wedged between the slider 202 and the disk surface 203. This wedge effect causes an increase in what is referred to as the "compression length" for the ABS of the slider.

Figure 3:
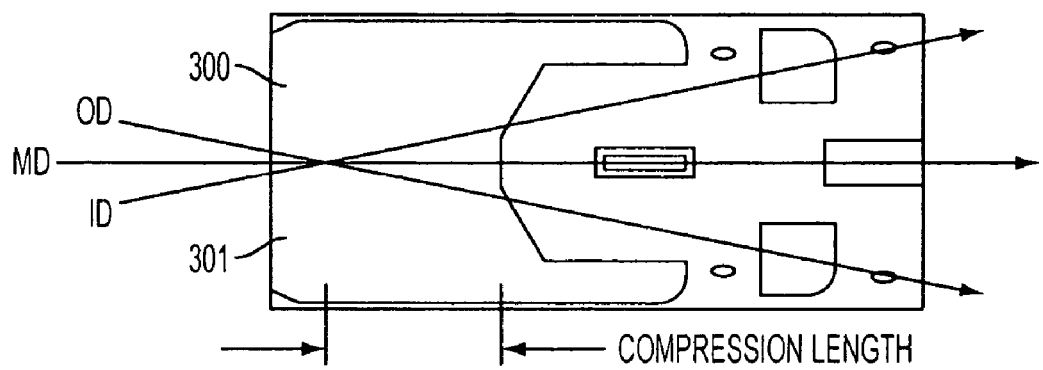
FIG. 3 illustrates a typical air bearing surface design resulting in a long compression length and corresponding particle flow direction.

Such a compression length is illustrated in FIG. 3. The ABS designs used currently have large air-bearing area at the leading portion 300 of the slider (such as leading pad 301). This is required to provide a high pitch angle for ABS designs with PDLC pads (i.e., pads made of diamond-like carbon) for friction reduction. The large area translates to a long compression length and results in higher compressive stress acting on the particle, causing it to be progressively wedged into the disk. Typical sizes of these particles found in failed drives are around 0.1 um to 0.5 um range which correlates well with the spacing at the leading edge of the slider.

It would be of great benefit to minimize or eliminate this wedging effect. In one embodiment of the present invention, the wedging effect is reduced by introducing a separation gap or a trench in the ABS design. This may relieve the compression stress and at the same time act as a conduit for deflecting particles away from under the ABS.

Figure 4:
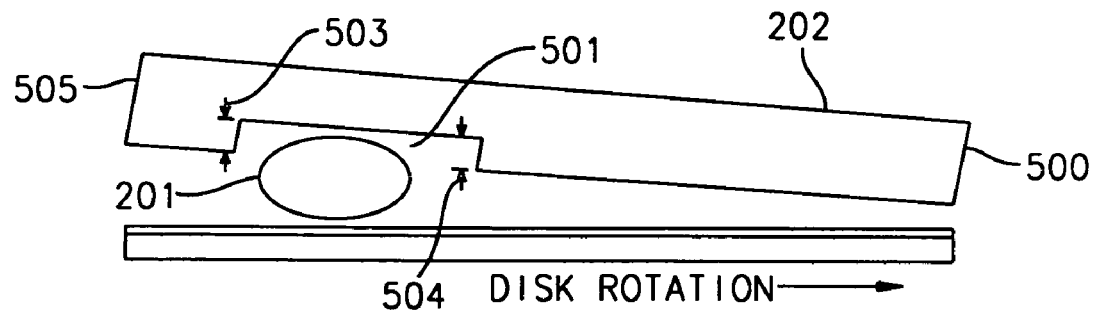
FIG. 4 illustrates the effect on a particle when implementing "trenches" in the slider design.
Figure 5:
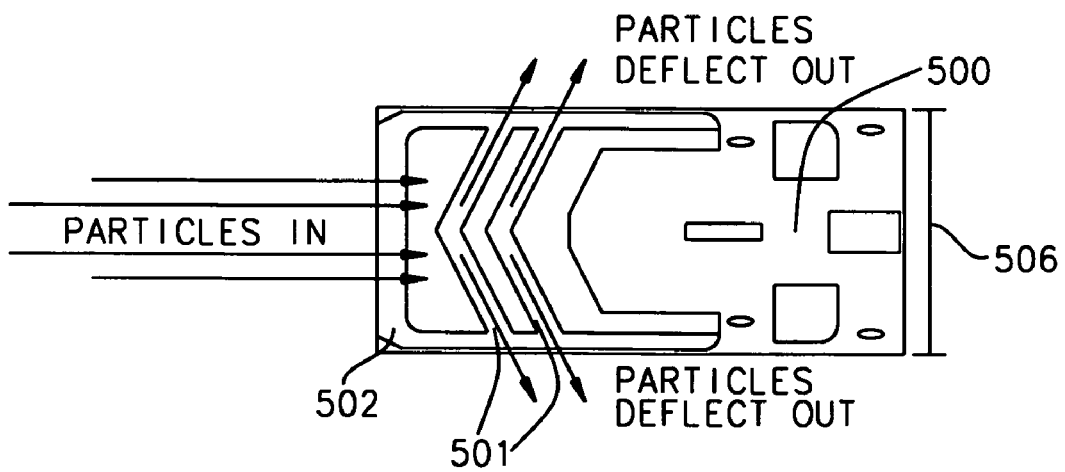
FIG. 5 illustrates one embodiment of the present invention of an air bearing surface design with particle deflection features.

FIGS. 4 and 5 show one embodiment of this particle deflection feature on an advanced ABS design. As shown in FIG. 5, this particular ABS design has two "trenches" 501 disposed in the leading portion of the ABS 502. These trenches are angled with respect to the width of the slider 500 (FIG. 4) to provide an easier path for the particles to flow out. The design of the trenches as shown are substantially parallel to the width of the slider 506 (FIG. 5). This design is especially conducive to achieving the goals detailed above because as the slider rotates around the disk, the particles are urged to move in the direction that is natural to the divergent momentum of the disk and the particles at the time. Therefore, the particles move through the trenches in a far more efficient fashion than they would with other designs. In this embodiment, the width of the trenches is 25 um to 40 um and is limited by the resolution of the photolithographic process in manufacturing the slider. In this embodiment, the depth of the trenches 504 is the same as that of the shallow step depth 503 that precedes the leading portion 505 of the slider. This shallow step provides an initial compression for incoming air. The depth of this shallow step may be on the order of 0.1 um. In this embodiment, the length of the trenches is approximately 0.75 mm.

The invention is not limited to the number of trenches or the angle of that these make with the width of the slider. As long as one or more trenches is present that is substantially parallel to the width of the slider, this feature will help to reduce the compression length and provide for particle deflection.

Figure 6A:
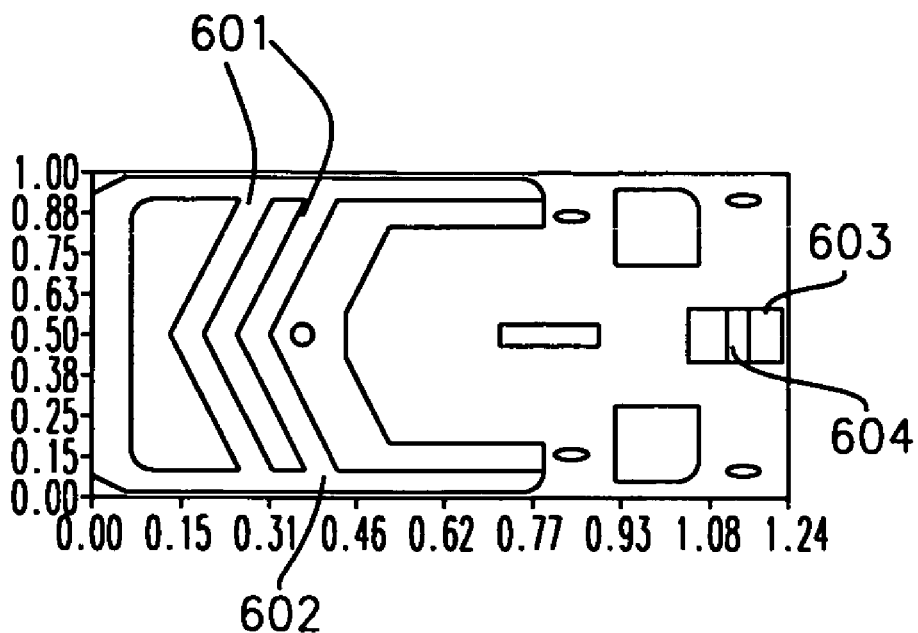
FIG. 6a-b illustrate additional embodiments of an air bearing surface design with particle deflection features of the present invention.
Figure 6B:
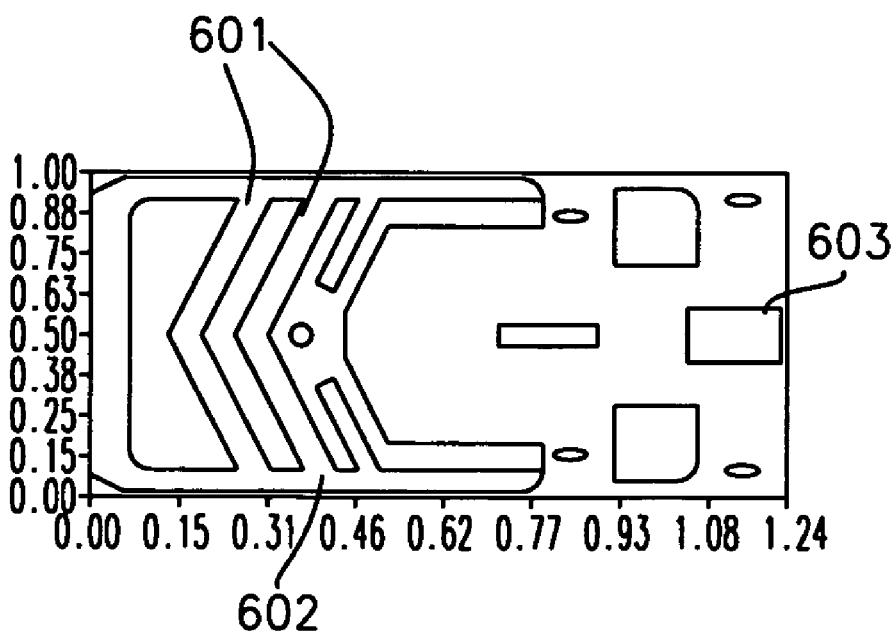

FIG. 6 shows other possible embodiments of this invention. FIG. 6a shows an ABS design with a trench 604 in the trailing edge pad 603 as well as trenches 601 in the leading edge portion of the ABS 602. FIG. 6b shows four separate trenches 601 in the leading edge portion of the ABS 602.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

The invention claimed is:

1. An air bearing slider comprising:
a slider body defined by a leading edge, a trailing edge, a center longitudinal line extending from the leading edge to the trailing edge, and an inner and outer edge extending longitudinally along the slider body on either side of the center line, the slider body including an air bearing surface including a leading portion and a step region extending from the leading edge of the slider to the leading portion of the air bearing surface, the leading portion including a trench angled from the center line of the slider toward the trailing edge of the slider and within the leading portion so as to extend from an inner edge of the leading portion to an outer edge of the leading portion wherein a width of the trench is 25 µm to 40 µm.

2. The air bearing slider of claim 1, wherein a width of the trench is adequate to allow the deflection of particles when the slider moves relative to a spinning disk.

3. The air bearing slider of claim 1, wherein a depth of the trench is equal to that of the step region.

4. The air bearing slider of claim 1, wherein the air bearing surface further includes a rear pad disposed proximately to a trailing edge of the slider, the rear pad further including a trench within the rear pad that extends from an inner edge of the rear pad to an outer edge of the rear pad.

5. A air bearing slider for use in a disk drive comprising:
a leading edge and a trailing edge; and
an air bearing surface including at least two main rails and a leading portion, wherein the leading portion includes at least one set of angled trenches substantially parallel to a width of the slider wherein said trenches are angled toward the trailing edge wherein a width of the trench is 25 µm to 40 µm.

6. The air bearing slider of claim 5, wherein a width of the rail is adequate to allow the deflection of particles when the slider moves relative to a spinning disk.

7. The air bearing slider of claim 5, wherein the air bearing surface includes a shallow step between the leading portion and the leading edge of the slider wherein a depth of the trench is equal to that of the shallow step.

8. A disk drive comprising:
a disk coupled to a spindle motor;
an actuator;
a slider including:
a leading edge and a trailing edge, and an air bearing surface including a leading portion;
at least two main rails; and
at least one set of angled trenches within the leading portion and substantially parallel to a width of the slider wherein the trenches are angled toward the trailing edge wherein a width of the trench is 25 µm to 40 µm.

9. The disk drive of claim 8, wherein a width of the rail is adequate to allow the deflection of particles when the slider moves relative to a spinning disk.

10. The disk drive of claim 8, wherein the air bearing surface includes a shallow step between the leading portion and the leading edge of the slider wherein a depth of the trench is equal to that of the shallow step.

11. An air bearing slider comprising:
a slider body defined by a leading edge, an inner and outer edge extending longitudinally along the slider body, and a trailing edge, the slider body including an air bearing surface including a leading portion and a step region extending from the leading edge of the slider to the leading portion of the air bearing surface, the leading portion including a trench within the leading portion that extends from an inner edge of the leading portion to an outer edge of the leading portion wherein a width of the trench is 25 µm to 40 µm.

12. An air bearing slider comprising:
a slider body defined by a leading edge, an inner and outer edge extending longitudinally along the slider body, and a trailing edge, the slider body including an air bearing surface including a leading portion and a step region extending from the leading edge of the slider to the leading portion of the air bearing surface, the leading portion including a trench within the leading portion that extends from an inner edge of the leading portion to an outer edge of the leading portion wherein a length of the trench is approximately 0.75 mm.

13. A air bearing slider for use in a disk drive comprising:
a leading edge and a trailing edge; and
an air bearing surface including at least two main rails and a leading portion, wherein the leading portion includes at least one set of trenches substantially parallel to a width of the slider wherein a width of a trench is 25 µm to 40 µm.

14. A air bearing slider for use in a disk drive comprising:
a leading edge and a trailing edge; and
an air bearing surface including at least two main rails and a leading portion, wherein the leading portion includes at least one set of trenches substantially parallel to a width of the slider wherein a length of each of said trenches is approximately 0.75 mm.

15. A disk drive comprising:
a disk coupled to a spindle motor;
an actuator;
a slider including:
a leading edge and a trailing edge, and an air bearing surface including a leading portion;
at least two main rails; and
at least one set of trenches within the leading portion and substantially parallel to a width of the slider wherein a width of the trench is 25 µm to 40 µm.

16. A disk drive comprising:
a disk coupled to a spindle motor;
an actuator;
a slider including:
a leading edge and a trailing edge, and an air bearing surface including a leading portion;
at least two main rails; and
at least one set of trenches within the leading portion and substantially parallel to a width of the slider wherein a length of each of said trenches is approximately 0.75 mm.

* * * * *